(12) United States Patent
Prause

(10) Patent No.: US 9,847,832 B2
(45) Date of Patent: *Dec. 19, 2017

(54) TESTING A PASSIVE OPTICAL NETWORK

(71) Applicant: VIAVI SOLUTIONS DEUTSCHLAND GMBH, Eningen Unter Achalm (DE)

(72) Inventor: Dominik Prause, Reutlingen (DE)

(73) Assignee: VIAVI SOLUTIONS DEUTSCHLAND GMBH, Eningen Unter Achalm (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/378,747

(22) Filed: Dec. 14, 2016

(65) Prior Publication Data

US 2017/0201320 A1    Jul. 13, 2017

Related U.S. Application Data

(63) Continuation of application No. 15/171,498, filed on Jun. 2, 2016, now Pat. No. 9,577,749, which is a continuation of application No. 14/452,624, filed on Aug. 6, 2014, now Pat. No. 9,379,813.

(Continued)

(51) Int. Cl.
*H04B 10/00* (2013.01)
*H04B 10/079* (2013.01)
(Continued)

(52) U.S. Cl.
CPC ... *H04B 10/0793* (2013.01); *H04B 10/07955* (2013.01); *H04B 10/27* (2013.01)

(58) Field of Classification Search
CPC ....... H04J 14/08; H04B 10/07; H04B 10/075; H04B 10/079; H04B 10/07955; H04B 10/0799

See application file for complete search history.

(56) References Cited

U.S. PATENT DOCUMENTS 8,068,729 B2    11/2011  Tanaka
8,213,002 B2     7/2012  Kassler et al.
(Continued)

FOREIGN PATENT DOCUMENTS

CN    102752211    10/2012
EP      1965517     9/2008
(Continued)

OTHER PUBLICATIONS

JDSU OLP-57 Smart Optical Power Meter Product Sheet; Downloaded from http://www.testequipmentdepot.com/ on Aug. 4, 2014.

(Continued)

*Primary Examiner* — Daniel Dobson
(74) *Attorney, Agent, or Firm* — Mannava & Kang, P.C.

(57) ABSTRACT

A test apparatus and method for testing passive optical networks is provided. The test apparatus includes an optical circuit having an optical coupler for splitting off a portion of optical traffic. During testing of a passive optical network, the optical circuit is coupled into an optical path of the passive optical network. A bit stream corresponding to an activating procedure is captured and analyzed to extract identification information of the module that sent the bit stream.

20 Claims, 19 Drawing Sheets

Related U.S. Application Data

(60) Provisional application No. 61/863,129, filed on Aug. 7, 2013.

(51) Int. Cl.
*H04B 10/27* (2013.01)
*H04J 14/00* (2006.01)

(56) References Cited

U.S. PATENT DOCUMENTS

| | | | |
|---|---|---|---|
| 2006/0171711 A1* | 8/2006 | Ruchet | H04B 10/079 398/9 |
| 2006/0198634 A1 | 9/2006 | Ofalt et al. | |
| 2007/0242954 A1 | 10/2007 | Sackman | |
| 2008/0187310 A1* | 8/2008 | Tanaka | H04J 3/14 398/9 |
| 2010/0316372 A1 | 12/2010 | Chang et al. | |
| 2010/0316373 A1 | 12/2010 | Chang et al. | |
| 2011/0141457 A1 | 6/2011 | Levin et al. | |
| 2013/0202290 A1 | 8/2013 | Dvir | |

FOREIGN PATENT DOCUMENTS

| | | |
|---|---|---|
| WO | WO-2005/036783 | 4/2005 |
| WO | WO-2012/127091 | 9/2012 |

OTHER PUBLICATIONS

International Telecommunication Union ITU-T G.983 series Series G: Transmissions Systems and Media, Digital Systems and Networks Papers and amendments published between Mar. 2001 and Jul. 2005.

International Telecommunication Union ITU-T G.984 series Series G: Transmissions Systems and Media, Digital Systems and Networks Papers and amendments published between Mar. 2003 and May 2012.

International Telecommunication Union ITU-T G.987 series Series G: Transmissions Systems and Media, Digital Systems and Networks Papers and amendments published between Jan. 2010 and Jun. 2012.

IEEE 802.3ah—IEEE Standard for Information Technology—Telecommunications and information exchange between systems—Local and Metropolitan area Networks—Specific requirements—Part 3: Carrier Sense Multiple Access with collision Detection (CSMA/CD) Access Method and Physical Layer Specifications Amendment: Media Access Control Parameters, Physical Layers and Management Parameters for Subscriber Access Networks—Sep. 7 2004.

IEEE 802.3av—IEEE Standard for Information Technology—Telecommunications and information exchange between systems—Local and Metropolitan area Networks—Specific requirements—Part 3: Carrier Sense Multiple Access with collision Detection (CSMA/CD) Access Method and Physical Layer Specifications Amendment 1: Physical Layer Specification and Management Parameters for 10Gb/s Passive Optical Networks—Oct. 30, 2009.

"Gigabit-capable Passive Optical Networks (G-PON): Transmission convergence layer specification; G.984.3 (Mar. 2008)" ITU-T Standard, International Telecommunication Union, Geneva; pp. 1-146 Mar. 29, 2008 (retrieved on Apr 24, 2009).

EP 14180105 Search Report dated Jan. 30, 2015.

* cited by examiner

800

PON Summary

801
PON type    GPON (ITU-T G.984)

| Upstream | | Downstream | |
|---|---|---|---|
| | 802 | | 806 |
| Wavelength | 1310 nm | Wavelength | 1490 nm |
| | 803 | | 807 |
| Power | -14.23 dBm | Power | -23.59 dBm |
| | 804 | | 808 |
| ONU-SN/ONU-MAC | 1234ABCD | PON-ID/OLT-MAC | 47110815 |
| ONU-ID/LLID | 23 | | |

TESTING A PASSIVE OPTICAL NETWORK

CROSS-REFERENCE TO RELATED APPLICATIONS

The present invention is a Continuation of commonly assigned and co-pending U.S. patent application Ser. No. 15/171,498, filed Jun. 2, 2016, now U.S. Pat. No. 9,577,749, issued Feb. 21, 2017, which is a Continuation of commonly assigned U.S. patent application Ser. No. 14/452,624, filed Aug. 6, 2014, now U.S. Pat. No. 9,379,813, issued on Jun. 28, 2016, which claims priority from U.S. Patent Application No. 61/863,129 filed Aug. 7, 2013, the disclosures of which are hereby incorporated by reference in their entireties.

TECHNICAL FIELD

The present invention relates to passive optical networks, and in particular to passive optical networks test equipment and methods.

BACKGROUND

Passive optical networks (PONs) are point-to-multipoint networks, in which a central optical line terminal (OLT) is connected with a plurality of optical network units (ONUs) by means of an optical distribution network (ODN) including spans of optical fiber connected by optical splitters and couplers (OSCs). Typically, a single OLT controls the communication with all ONUs installed in a PON, broadcasting downstream signals to the ONUs, and organizing upstream communication from the ONUs to the OLT using time-domain multiple access (TDMA). In TDMA, each ONU is assigned a time slot, within which the ONU may transmit an upstream signal. The OLT is configured to ensure that upstream transmissions from different ONUs do not collide, that is, do not occupy a same time slot. Due to the TDMA organization of a PON, upstream transmissions from ONUs to the OLT are usually bursty in nature, while the downstream transmissions from the OLT to ONUs tend to be more continuous. A technician servicing a PON travels to various locations of the ODN, and checks optical power levels at those locations, to ensure that optical signals propagate to appropriate ODN destinations with acceptable optical loss. Both average optical power levels and peak optical power levels may be measured and recorded. Peak optical power levels may be useful for characterization of bursty upstream signals.

Referring to FIG. 1, a prior-art PON test device 100 is shown. The PON test device 100 was disclosed by Ruchet in US Patent Application Publication 2006/0171711 A1. The PON test device 100 includes a 2×2 coupler 32, a wavelength division multiplexor (WDM) 68, and first 38, second 42, and third 44 photodetectors for detecting optical signals at wavelengths of 1310 nm, 1490 nm, and 1550 nm, respectively.

In operation, the test device 100 is coupled in an optical path between an OLT 110 and an ONU 120. The OLT 110 generates downstream optical signals S2 at 1490 nm and S3 at 1550 nm, which are coupled to a first through port 28 of the 2×2 coupler 32. The 2×2 coupler 32 power-splits the downstream optical signals S2 and S3. Eighty percent (80%) of optical power of the downstream optical signals S2 and S3 are coupled to a second through port 30 of the 2×2 coupler 32. Then, the signals S2 and S3 (attenuated by 20% by the 2×2 coupler 32) propagate to the ONU 120. Twenty percent (20%) of the optical power of the downstream optical signals S2 and S3, denoted in FIG. 1 as S2' and S3', are coupled to a first drop port 36 of the 2×2 coupler 32. The first drop port 36 is coupled to the WDM 68. The WDM 68 separates the signals S2' and S3', directing the resulting signals S2", S3" to the second 42 and third 44 photodetectors, respectively.

The ONU 120 generates an upstream optical signal S1 at 1310 nm, which is coupled to the second through port 30 of the 2×2 coupler 32. The 2×2 coupler 32 power-splits the upstream optical signal S1. Eighty percent (80%) of the optical power of the upstream optical signal S1 is coupled to the first through port 28 of the 2×2 coupler 32, and the attenuated signal S1 propagates to the OLT 110. Twenty percent (20%) of the optical power of the upstream optical signal S1, denoted in FIG. 1 as S1', is coupled to a second drop port 34 of the 2×2 coupler 32. The split signal S1' is coupled to the first photodetector 38. As a result, the optical power of the signals S1, S2, and S3 propagating between the OLT 110 and the ONU 120, may be measured without breaking an optical link between the OLT 110 and the ONU 120.

In a PON, a large number of ONUs may be connected to a single OLT. When the PON is expanded or reconfigured, some ONUs remain connected to the ODN, and some ONUs are transferred to be connected to different optical fibers within the ODN. Due to a high reconfiguration rate of the PON, and due to a large number of optical connections within the PON, network operators are increasingly facing a problem that network documentation is not synchronized with a current configuration of the PON, making network servicing difficult. It is not uncommon for a service technician to call the central office for a network update, and/or disconnect individual subscribers successively one by one, in an attempt to find a correct optical fiber to take an optical power measurement. Besides being tedious and prone to misconnection errors, this procedure is disruptive to subscribers.

SUMMARY

A testing apparatus according to the invention may capture activation bit streams between ONU and OLT, and analyze the activation bit streams to identify network equipment participating in the communication.

In accordance with an aspect of the invention, there is provided an apparatus for testing a passive optical network comprising an optical line terminal, a plurality of optical network units including a first optical network unit, and an optical distribution network for carrying bidirectional optical traffic between the optical line terminal and the first optical network unit, the bidirectional optical traffic comprising downstream traffic from the optical line terminal to the first optical network unit, and upstream traffic from the first optical network unit to the optical line terminal, wherein the optical line terminal is configured to use an activation procedure for establishing communication with the first optical network unit, the apparatus comprising:

an optical circuit comprising an optical coupler and first and second input optical ports for optically coupling the optical circuit into the optical distribution network between the optical line terminal and the first optical network unit, the optical coupler comprising first and second through ports for carrying the bidirectional optical traffic therebetween, and a first drop port for dropping a portion of the upstream traffic, wherein the first through port is optically coupled to the first input optical port;

an upstream receiver optically coupled to the first drop port for receiving the upstream traffic portion; and a controller operationally coupled to the upstream receiver and the optical breaker switch and configured to:

capture the upstream traffic portion received by the upstream receiver during the activation procedure; and extract identification information of the first optical network unit from the captured upstream traffic portion.

In one exemplary embodiment, the optical circuit further comprises an optical breaker switch serially coupled to the optical coupler, the optical breaker switch comprising a first switch port optically coupled to the second through port of the optical coupler, and a second switch ports optically coupled to the second input optical port;

wherein the controller is further configured to cause the optical breaker switch to uncouple and then re-couple the first and second switch ports to cause a temporary interruption of the bidirectional optical traffic therebetween, thereby initiating the activation procedure between the optical line terminal and the first optical network unit upon re-coupling of the first and second switch ports.

In one exemplary embodiment, the optical coupler further comprises a second drop port for dropping a portion of the downstream traffic, and the apparatus further includes a downstream receiver optically coupled to the second drop port of the optical coupler for receiving the downstream traffic portion. The controller may be operationally coupled to the downstream receiver and configured to capture the downstream traffic portion received by the downstream receiver after the interruption, during the activation procedure, and to extract identification information of the optical line terminal from the captured downstream traffic portion.

In accordance with an embodiment of the invention, there is further provided a method for testing a passive optical network comprising an optical line terminal, a plurality of optical network units including a first optical network unit, and an optical distribution network for carrying bidirectional optical traffic between the optical line terminal and the first optical network unit, the bidirectional optical traffic comprising downstream traffic from the optical line terminal to the first optical network unit, and upstream traffic from the first optical network unit to the optical line terminal, wherein the optical line terminal is configured to use an activation procedure for establishing communication with the first optical network unit, the method comprising:

(a) coupling an optical circuit into the optical distribution network between the optical line terminal and the first optical network unit, the optical circuit including an optical coupler comprising first and second through ports for carrying the bidirectional optical traffic therebetween, and a first drop port for dropping a portion of the upstream traffic;

(b) initiating the activation procedure between the optical line terminal and the first optical network;

(c) capturing the portion of the upstream traffic after the interruption of step (b), during the activation procedure; and (d) extracting identification information of the first optical network unit from the upstream traffic portion captured in step (c).

BRIEF DESCRIPTION OF THE DRAWINGS

Exemplary embodiments will now be described in conjunction with the drawings, in which:

FIG. 8 illustrates a PON summary screen shown on a display of the testing device of FIG. 3.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
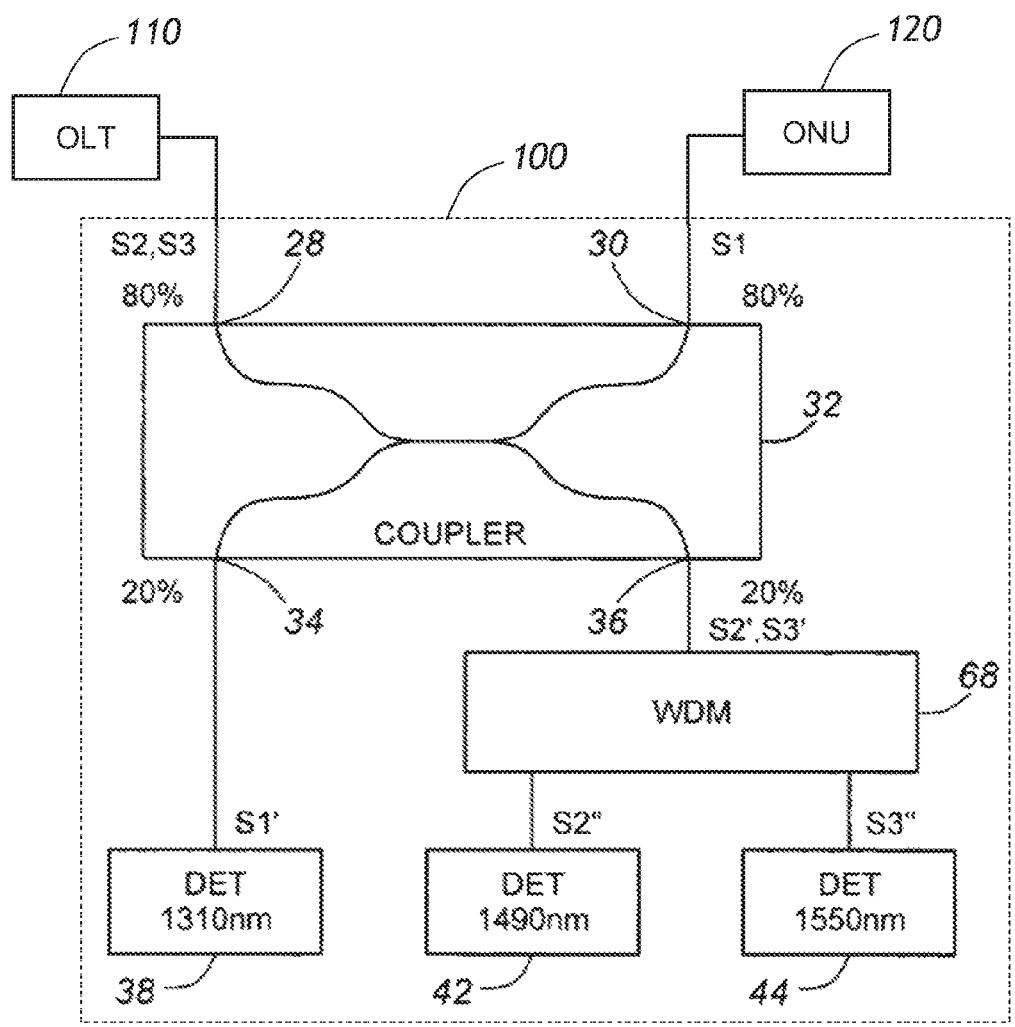
FIG. 1 illustrates a schematic view of a prior-art PON optical tester.
Figure 2:
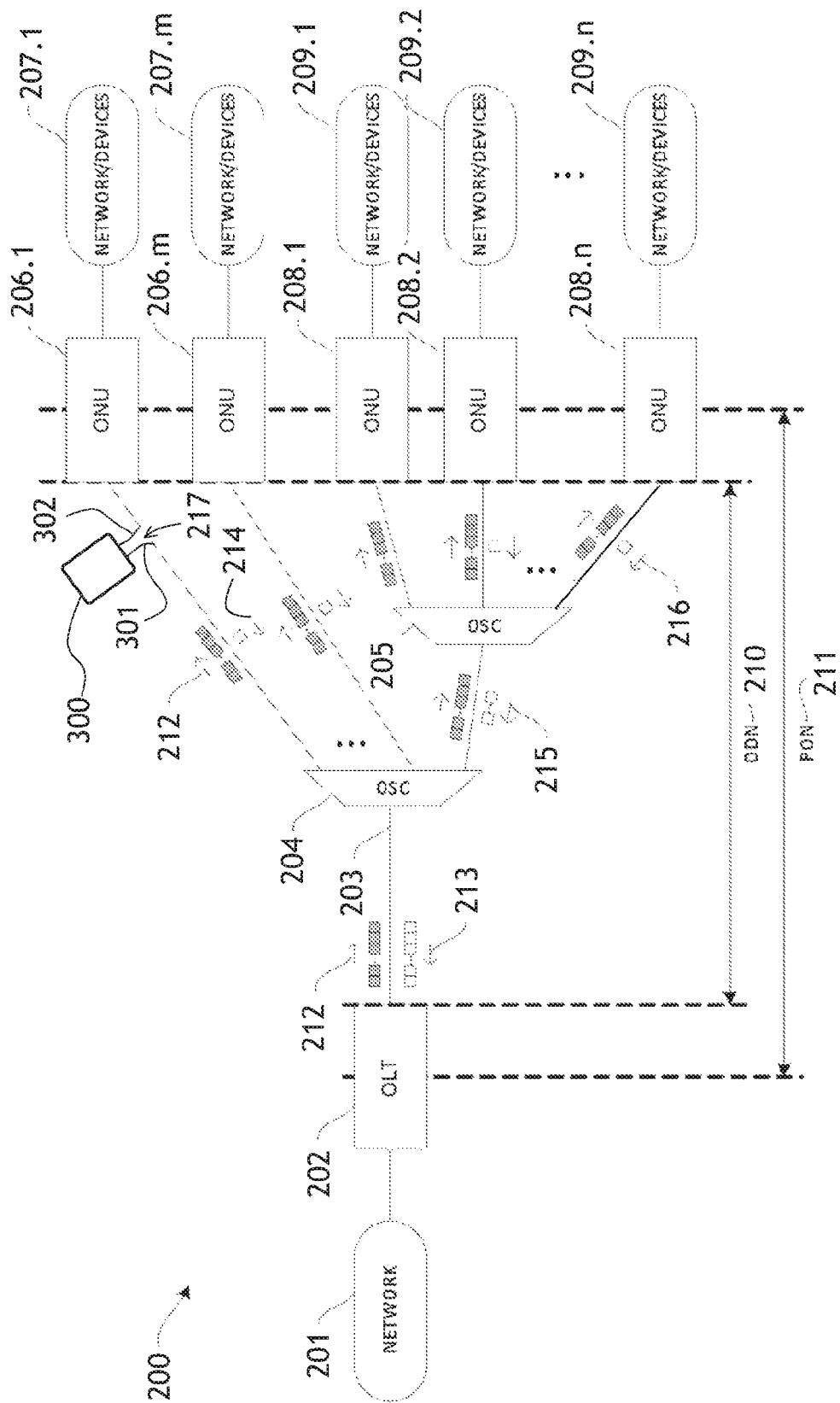
FIG. 2 illustrates an exemplary schematic view of a PON being tested in accordance with the invention.

Referring to FIG. 2, an exemplary network system 200 includes a PON under test 211. The PON 211 may include a plurality of ONUs 206.1 . . . 206.*m* and 208.1, 208.2, . . . 208.*n* optically coupled to an OLT 202 via an ODN 210. The ODN 210 typically includes only passive components, for instance optical fibers 203, optical power splitters/combiners (OSC) 204 and 205, and the like. The OLT 202 is typically connected to another network 201, e.g. an Ethernet™ network, which serves as an external source and recipient of communications. The ONUs 206.1 . . . 206.*m*, 208.1, 208.2, . . . 208.*n* may be connected with respective subscriber networks or subscriber devices 207.1 . . . 207.*m*, 209.1, 209.2, . . . 209.*n*, which may be a source and recipient of payload data transmitted in the PON from the subscriber's side. The terms "optical network unit" or "ONU" and "optical network terminal" or "ONT" are used interchangeably herein, because they behave similarly with respect to embodiments of this invention. ONUs are usually deployed near a group of customer premises or "at a curb", whereas ONTs are usually deployed at individual customer premises. For simplicity, the term "ONU" is selected to denote both ONU and ONT, unless specified otherwise. It is to be noted that the ONU(s) 206.1 to 206.*m* and 208.1 to 208.*n* may receive and transmit data from and to the PON 211, and may be connected to other networks, such as Ethernet, digital subscriber lines, standard telephones (PSTN), or network devices, such as computer terminals, video devices, Ethernet units, and the like.

In operation, the ODN 210 carries bidirectional optical traffic between the OLT 202 and the ONUs 206.1 to 206.*m*, 208.1 to 208.*n* using standard communication protocols, e.g. those described in ITU-T G.984/7 or IEEE 802.3ah/av communication standards. The bidirectional optical traffic includes downstream traffic 212 and upstream traffic 213. In a typical network configuration, the downstream traffic carries data broadcast by the OLT 202 to the ONUs 206.1 to 206.*m*, 208.1 to 208.*n*, such as, for example, television data, as well as data intended to individual ONUs 206.1 to 206.*m*, 208.1 to 208.*n*, tagged with identification data to identify intended recipients. The downstream traffic 212 is power divided by the OSC 204, 205. In general, a hierarchy of OSCs 204, 205 may exist in the ODN 210. Each of the OSCs 204, 205 power-divides the downstream traffic 212, typically equally between its output legs.

The upstream traffic 213 is commonly organized using TDMA. The OLT 202 operates as a "master", which assigns a time slot to each of the ONU(s) 206.1 to 206.*m*, 208.1 to 208.*n*, during which an upstream transmission may be performed. The OSCs 204, 205 combine all signals arriving at downstream facing ports into the combined upstream traffic 213, in which all of the upstream signal bursts e.g. 214, 215, 216, arrive properly separated. For example, the signal burst 214 is sent from the "first" ONU 206.1 to the OLT 202. Herein, the terms "first", "second", and the like are not intended to denote the order of appearance, but are merely used as identifiers.

The PON 211 may be tested by disconnecting optical fibers at a test point 217, and inserting a test apparatus 300 by coupling its first 301 and second 302 input optical ports to the disconnected optical fibers. In this manner, the downstream traffic 212 and the upstream traffic 214 between the OLT 202 and the first ONU 206.1 can be made to flow through the test apparatus 300. From here on in, the term "upstream traffic" will be used to identify the upstream burst 214, which carries upstream information sent by the "first" ONU 206.1 to the OLT 202. It is to be understood that tests can be performed by inserting the test instrument 300 at another test point, not shown, of the ODN 210. In other words, the test point 217 and the first ONU 206.1 are considered only by way of a non-limiting example, which is given to illustrate operation of the test apparatus 300.

Figure 3:
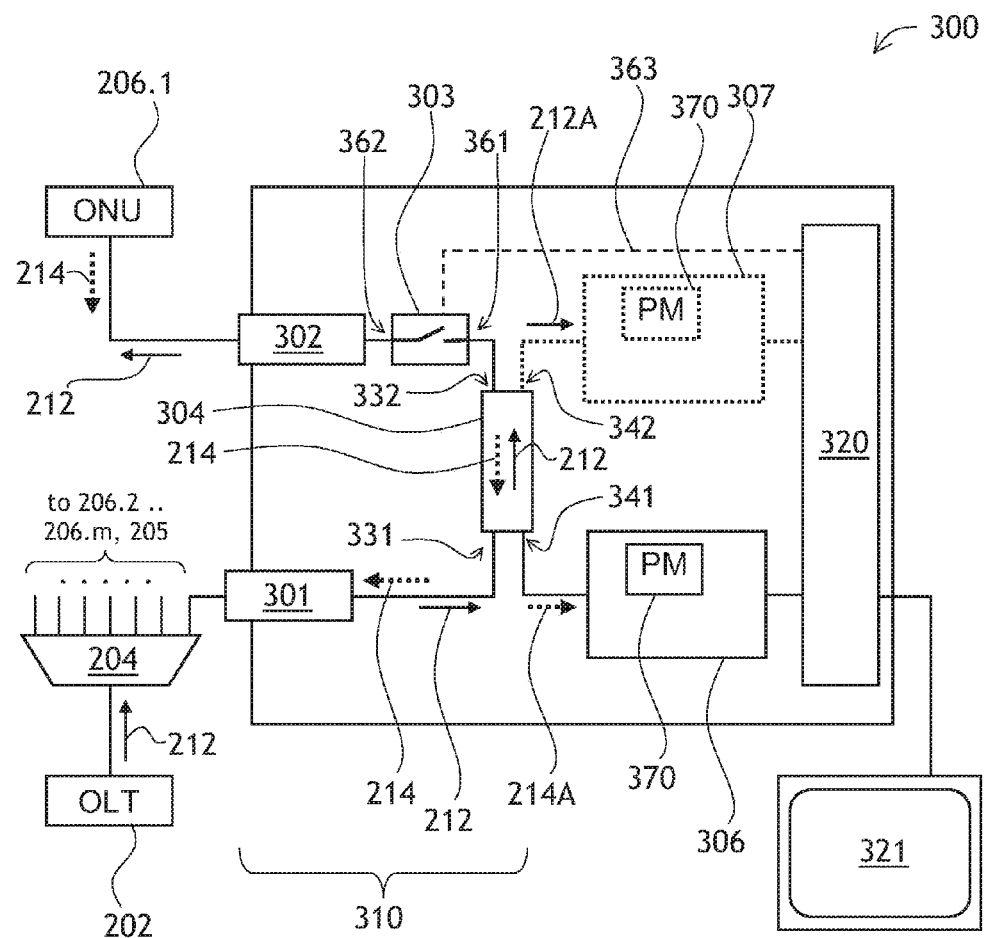
FIG. 3 illustrates an exemplary schematic view of a test apparatus according to one embodiment of the invention.

Referring to FIG. 3, the test apparatus 300 has an optical circuit 310, which may include an optical coupler 304 and an optical breaker switch 303 serially coupled together between the first 301 and second 302 input optical ports. The optical circuit 310 is shown coupled into the ODN 210 at the test point 217 between the OLT 202 and the first ONU 206.1 (FIG. 2). The optical coupler 304 (FIG. 3) includes first 331 and second 332 through ports for carrying the bidirectional optical traffic between the first 331 and second 332 through ports. The optical coupler 304 further includes a first drop port 341 for dropping a portion 214A of the upstream traffic 214. The first through port 331 is coupled to the first input optical port 301.

The optical breaker switch 303 includes first 361 and second 362 optical ports, termed herein "switch ports". The optical breaker switch 303 is configured to optically couple and uncouple the first 361 and second 362 switch ports in a controllable fashion. For example, the coupling and uncoupling may be performed in response to a command e.g. an electrical signal on a control line 363. The first switch port 361 is optically coupled to the second through port 332 of the optical coupler 304, and the second switch port 362 is optically coupled to the second input optical port 302. The optical breaker switch 303 may be also coupled between the first through port 331 and the first optical port 301.

An upstream receiver 306 is optically coupled to the first drop port 341 of the optical coupler 304 for receiving the upstream traffic portion 214A. A controller 320 is operationally coupled to the upstream receiver 306. The controller 320 may be coupled to the optical breaker switch 303 via the control line 363. The controller 320 may be configured to cause the optical breaker switch 304 to uncouple and then re-couple the first 361 and second 362 switch ports, so as to cause a temporary interruption of the bidirectional optical traffic between the first 361 and second 362 switch ports. The purpose of this brief interruption, for example no longer than 1 second and more preferably between 200 ms and 500 ms, is to initiate an activation, or "discovery" procedure between the OLT 202 and the first ONU 206.1 upon re-coupling of the first 361 and second 362 switch ports. The activation procedure is known and corresponds to a communication standard used in a particular network. The controller 320 may be further configured to capture the upstream traffic portion 214A received by the upstream receiver 306 after the interruption and during the activation procedure. The captured upstream traffic portion includes identification information of the first ONU 206.1. The controller 320 may be configured to extract this information, thereby identifying the first ONU 206.1. The upstream receiver 306 may include an optical power meter (PM) 370 for determining an optical power level of the upstream traffic 214 from the dropped upstream traffic portion 214A. A display 321 may be further provided for displaying the optical power level of the upstream traffic 214 together with the identification information of the first ONU 206.1. In one embodiment, an external display may be used.

The test apparatus 300 may be implemented without the optical breaker switch 303. For this embodiment, the controller 320 may be configured to capture the upstream traffic portion 214A received by the upstream receiver 306 upon coupling of the first 301 and second 302 optical connectors into the ODN 210 at the test point 217, during the activation procedure, which automatically follows the coupling. It is preferred to include the optical breaker switch 303 into the optical circuit 310, because the optical breaker switch 303 provides a controllable, repeatable interruption of the optical communication between the OLT 202 and the first ONU 206.1.

In the embodiment shown in FIG. 3, the optical coupler 304 includes an optional second drop port 342 for dropping a portion 212A of the downstream traffic 212. In this embodiment, the apparatus 300 further includes a downstream receiver 307 optically coupled to the second drop port 342 of the optical coupler 304 for receiving the downstream traffic portion 212A. The controller 320 may be operationally coupled to the downstream receiver 307 and configured to capture the downstream traffic portion 212A received by the downstream receiver 307 after the interruption, preferably during the activation procedure, and to extract identification information of the OLT 202 and/or the PON 211 from the captured downstream traffic portion 212A. The capturing and the identification information extraction from the downstream traffic portion 212A does not have to take place during the activation procedure, and may be performed at any time during downstream transmission.

The downstream receiver 307 may further include its own optical power meter 370. In this configuration, an optical power level of both the upstream 214 and downstream 212 traffic may be determined from the dropped respective upstream 214A and downstream 212A traffic portions. The optical power level of the upstream traffic 214 may be displayed on the display 321 together with the identification information of the first ONU 206.1, and the optical power level of the downstream traffic 212 may be displayed on the display 321 together with the identification information of the OLT 202.

Figure 4A:
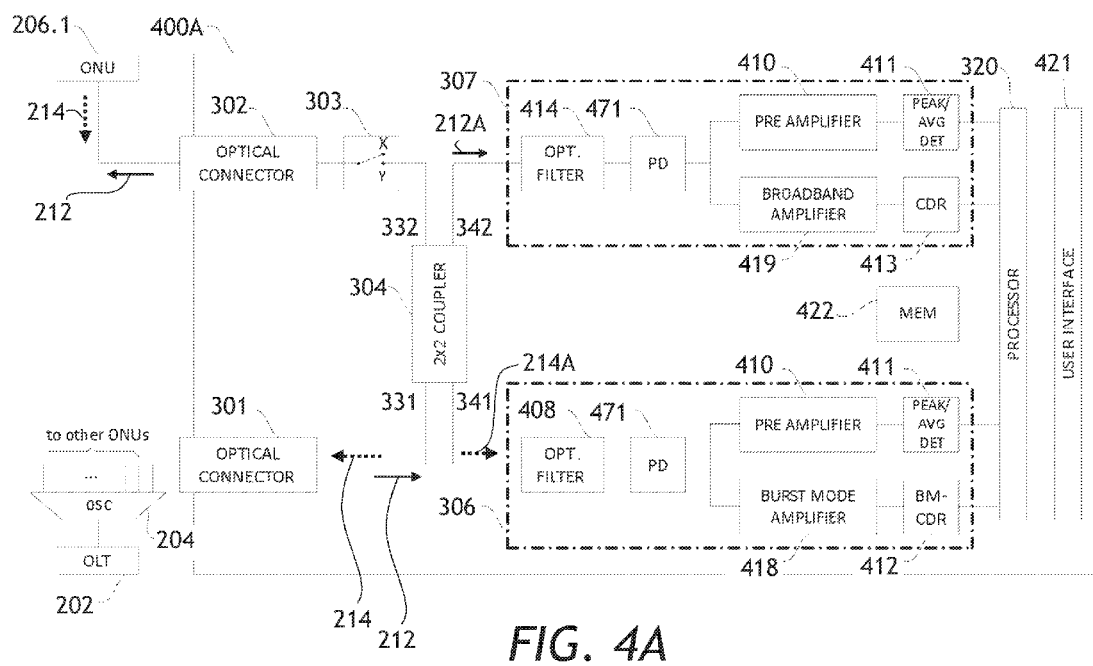
FIGS. 4A to 4D illustrate exemplary schematic views of a test apparatus of the invention, including a single photodiode for each of the upstream and downstream paths (FIGS. 4A and 4B); a power splitter and two photodiodes for each of the upstream and downstream paths (FIG. 4C); and a common optical filter, power splitter, and two photodiodes for each of the upstream and downstream paths (FIG. 4D)

Referring now to FIG. 4A, a test apparatus 400A is an embodiment of the test apparatus 300 of FIG. 3. A non-transitional memory 422 has stored computer instructions for the processor 320. Captured bit streams and/or test results may also be stored in the non-transitional memory 422. A user interface 421 may include the display 321 (not shown in FIG. 4A), along with a user input device such as a set of buttons, for example. In the embodiment shown in FIG. 4A, the upstream receiver 306 of the test apparatus 400A includes an upstream optical filter 408 coupled to the first drop port 341 of the optical coupler 304, for selecting a wavelength band corresponding to the upstream traffic 214. Similarly, the optional downstream receiver 307 may include a downstream optical filter 414 coupled to the second drop port 342 of the optical coupler 304, for selecting a wavelength band corresponding to the downstream traffic 214. By way of a non-limiting example, the downstream optical filter 414 may transmit wavelengths of 1490 nm±10 nm and/or 1578 nm±10 nm, and the upstream optical filter 408 may use wavelengths of 1270 nm±10 nm and/or 1310 nm±10 nm. The optical filters 408 and 414 may be based on thin film filters, metal-dielectric filters, color glass filters, and the like.

The upstream receiver 306 of the test apparatus 400A may further include a photodetector 471 optically coupled to the upstream optical filter 408, for providing an electrical signal in response to the upstream traffic portion 214A. A burst mode amplifier 418 may be electrically coupled to the first photodetector 471 for broadband amplification of the electrical signal to provide an upstream traffic electrical waveform. A burst mode clock data recovery circuit 412 may be electrically coupled to the burst mode amplifier 418 and the processor 320, for recovering clock data from the upstream traffic electrical waveform. In the embodiment shown, the upstream receiver 306 of the test apparatus 400A also includes a pre-amplifier 410 coupled to a peak/average signal detector 411, for determining a peak and/or average optical power of the upstream traffic 214. Other types of amplifiers may be used.

The downstream receiver 307 of the test apparatus 400A may also include its own photodetector 471 optically coupled to the downstream optical filter 414, for providing an electrical signal in response to the downstream traffic portion 212A. A broadband amplifier 419 may be electrically coupled to the photodetector 471 for broadband amplification of the electrical signal to provide an upstream traffic electrical waveform. A downstream clock data recovery circuit 413 may be electrically coupled to the broadband amplifier 419 and the processor 320, for recovering clock data from the downstream traffic electrical waveform. The downstream receiver 307 of the test apparatus 400A may also include its own pre-amplifier 410 coupled to the peak/average signal detector 411, for determining a peak and/or an average optical power of the downstream traffic 212. Many types of amplifiers may be used. Furthermore, the downstream clock data recovery circuit 413 may be operationally coupled to the burst mode clock data recovery circuit 412, to facilitate the clock recovery of a bursty upstream signal.

Figure 4B:
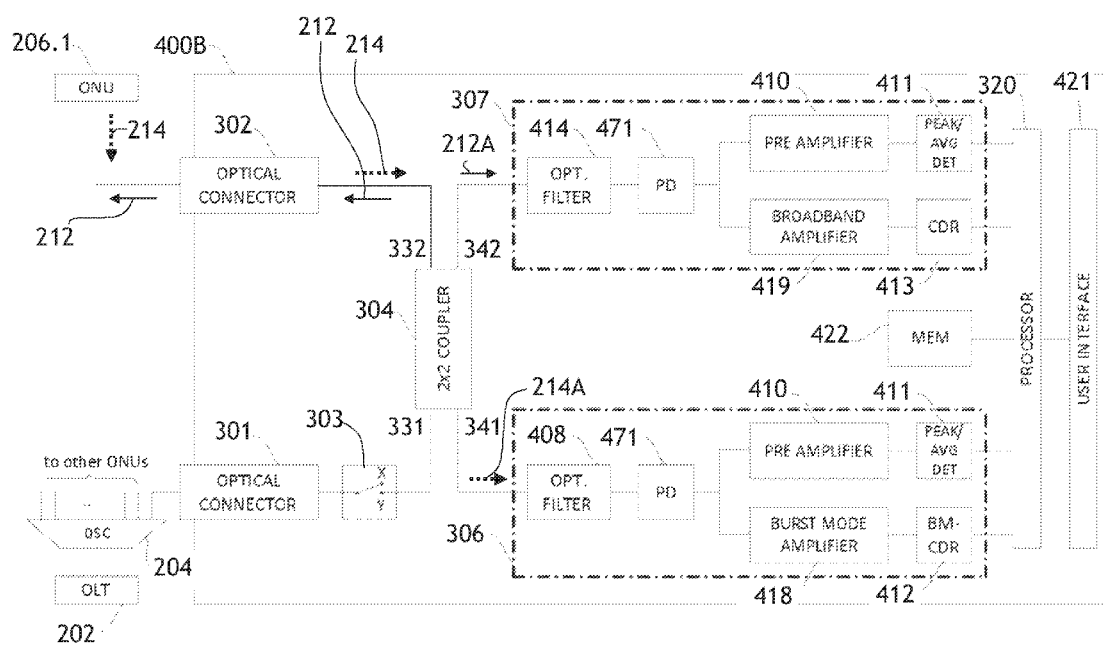

Referring to FIG. 4B, a test apparatus 400B is a variant of the test apparatus 400A of FIG. 4A. In the apparatus 400B of FIG. 4B, the optical breaker switch 303 and the 2×2 optical coupler 304 are swapped with each other: the second through port 332 of the 2×2 optical coupler 304 is coupled to the second input optical port 302, and the first through port 331 of the 2×2 optical coupler 304 is coupled to the optical breaker switch 303, which is coupled to the first input optical port 301.

Figure 4C:
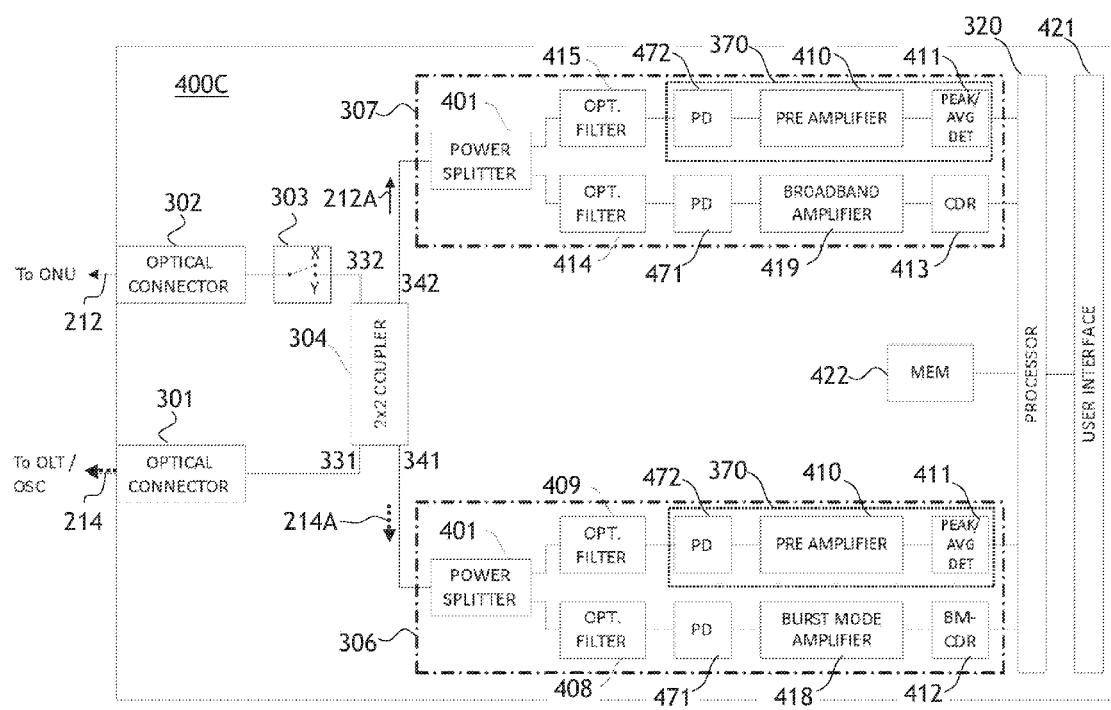

Turning to FIG. 4C, a test apparatus 400C is a variant of the test apparatus 400A of FIG. 4A. In the test apparatus 400C of FIG. 4C, the upstream receiver 306 further includes an optical power splitter 401 coupled to the upstream optical filter 408. A second upstream optical filter 409 may be optically coupled to the optical power splitter 401, with a second photodetector 472 coupled to the second upstream optical filter 409. The second photodetector 472 provides an electrical signal in response to the upstream traffic portion 214A. The pre-amplifier 410 may be electrically coupled to the second photodetector 472, for amplifying the electrical signal. The peak or average signal detector 411 may be coupled to the pre-amplifier 410 and the processor 320, for detecting a peak or average value of the electrical signal. Together, the second photodetector 472, the pre-amplifier 410, and the peak or average signal detector 411 make up the optical power meter 370 of the upstream receiver 306 of FIG. 3. In FIG. 4C, the upstream optical power meter 370 is coupled to the optical power splitter 401, and is calibrated for determining the optical power level of the upstream traffic 214 from the detected portion 214A. Using two photodetectors 408 and 409 allows one to individually optimize performance of light detection for power measurement and electrical signal waveform generation purposes.

In the embodiment of FIG. 4C, the downstream receiver 307 also includes the optical power splitter 401, which is coupled to the downstream optical filter 414. A second downstream optical filter 415 may be optically coupled to the optical power splitter 401, with the second photodetector 472 coupled to the second downstream optical filter 415. The second photodetector 472 provides an electrical signal in response to the downstream traffic portion 212A. Another pre-amplifier 410 may be electrically coupled to the second photodetector 472, for amplifying the electrical signal.

Finally, another peak or average signal detector 411 may be coupled to the pre-amplifier 410 and the processor 320, for detecting a peak or average value of the electrical signal. Together, the second photodetector 472, the pre-amplifier 410, and the peak or average signal detector 411 make up the downstream optical power meter 370 of the downstream receiver 307 of FIG. 3. In the test apparatus 400C of FIG. 4C, the downstream optical power meter 370 is coupled to the optical power splitter 401, and is calibrated for determining an optical power level of the downstream traffic 212 from the detected portion 212A.

Figure 4D:
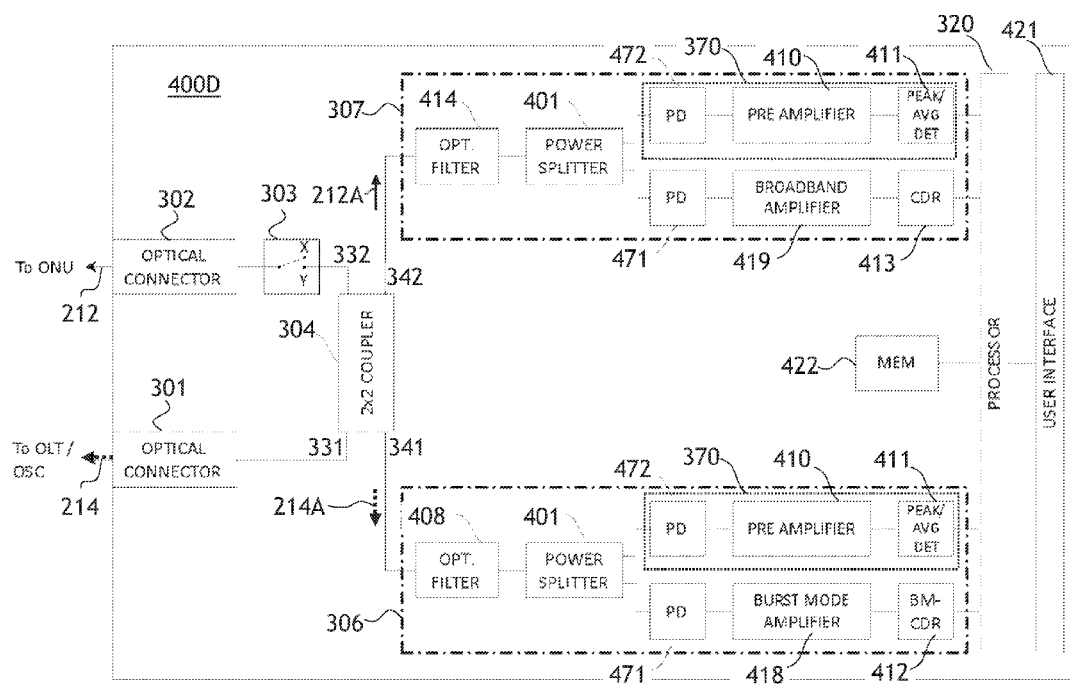

Referring now to FIG. 4D, a test apparatus 400D is a variant of the test apparatus 400C of FIG. 4C. In the apparatus 400D of FIG. 4D, the upstream optical filter 408 and the downstream optical filter 414 are placed before the power splitters 401, alleviating the need for second upstream 409 and downstream 415 respective optical filters.

Figure 5:
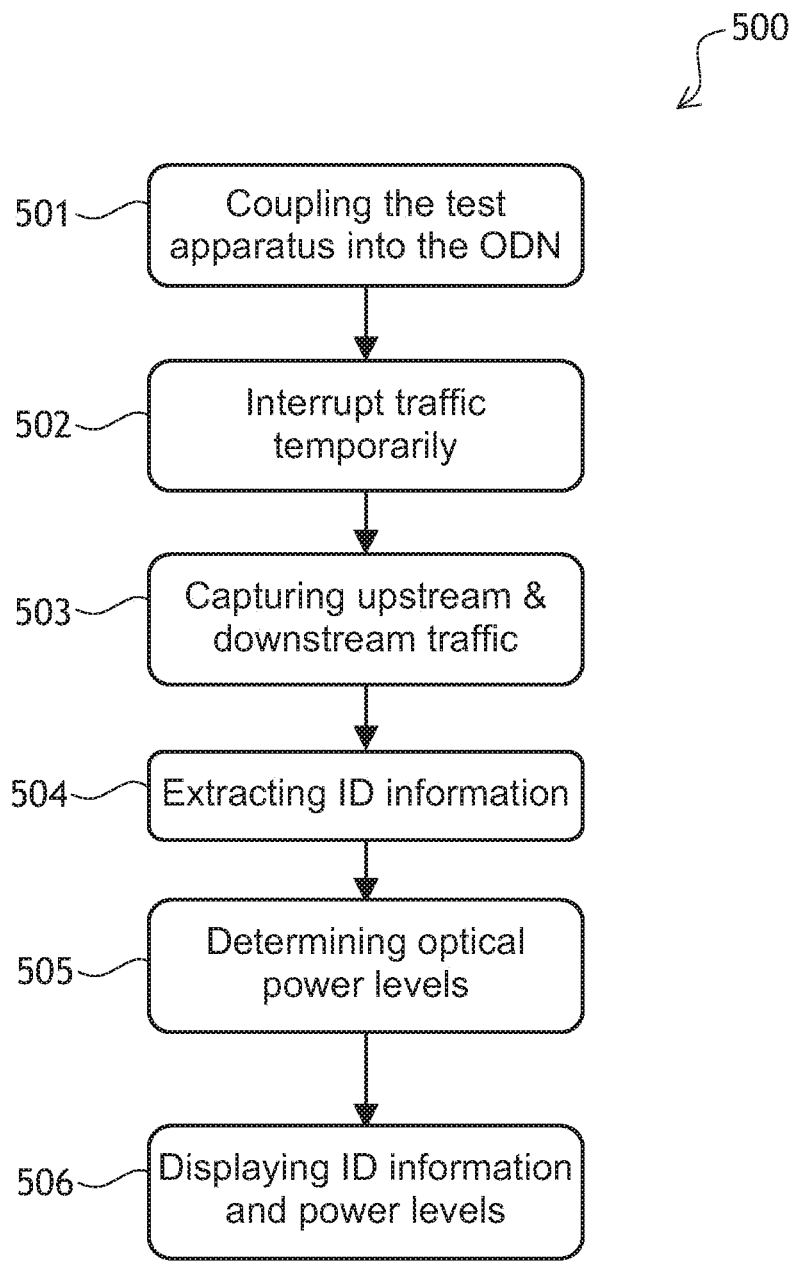
FIG. 5 illustrates an exemplary flow chart of a method for testing a PON according to the invention.

Turning to FIG. 5 with further reference to FIGS. 2 and 3, a method 500 (FIG. 5) for testing the PON 211 (FIG. 2) includes a step 501 of coupling the optical circuit 310 of the test apparatus 300 into the ODN 210 between the OLT 202 and the first ONU 206.1. In a step 502, the optical breaker switch 303 is operated to open and then close the optical circuit 310, so as to cause a temporary interruption of the bidirectional optical traffic in the optical circuit 310. As a result of the interruption, an activation procedure is initiated between the OLT 202 and the first ONU 206.1 (and other ONUs 206.2 to 206.m, 208.1 to 208.n) upon closing the optical circuit 310. In a step 503, the portion 214A of the upstream traffic 214 is captured after the interruption 502, during the activation procedure. The portion 212A of the downstream traffic 212 may also be captured in this step. The capturing may include storing the received activation bit stream(s) in the memory 422 of the test apparatuses 400A to 400D of FIGS. 4A to 4D, respectively. In a step 504, identification information of the first ONU 206.1 is extracted from the upstream traffic portion 214A, captured in step 503. Identification information of the OLT 202 and/or the PON 211 may also be extracted in this step.

In an optional step 505, optical power levels of the upstream 214 and/or downstream 212 traffic may be determined. By way of an example, optical power meters 370 shown in FIGS. 3, 4C, and 4D may be used for this purpose. Finally, in an optional step 506, the determined optical power levels may be displayed on the display 321 (FIG. 3) along with the identification information of the first ONU 206.1 and the OLT 202. In this manner, a user of the test apparatus 300 and 400A to 400D may associate the measured optical power levels with a particular ONU or OLT of the PON 211.

Referring back to FIG. 3 and FIGS. 4A to 4D, the processor 320 may be configured to extract the ID information from the upstream and/or downstream traffic in the step 504 of the method 500, to identify the ONU 206.1 to 206.m, 208.1 to 208.n, and/or the OLT 202. Specific implementation of the extracting step 504 of the method 500 of FIG. 5 depends on a specific PON type. Data structures and extraction methods for most widely deployed PON types, i.e. GPON, XG-PON, EPON, 10G-EPON, are considered below with reference to FIGS. 6A to 6G and FIGS. 7A to 7F. Only relevant data components will be described.

Figure 6A:
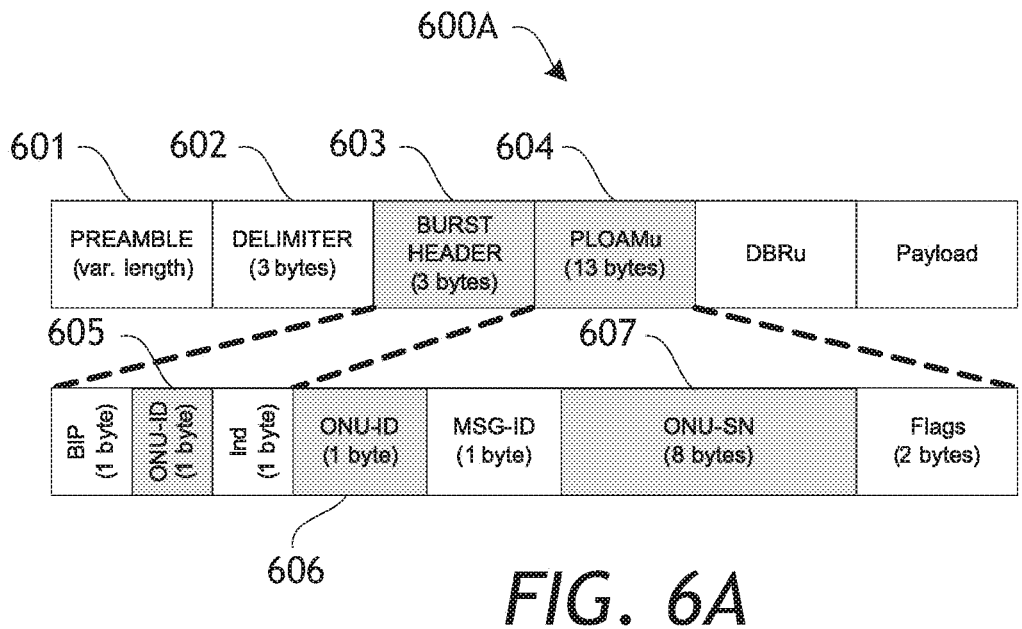
FIG. 6A is a schematic data structure diagram indicating a location of an ONU identification number (ONU-ID) and an ONU serial number (ONU-SN) in a gigabit-PON (G-PON) upstream data burst.

Referring first to FIG. 6A, a structure of a typical GPON upstream burst 600A is shown. The upstream burst 600A includes a preamble portion 601, which may have a dynamically defined length. To the right of the preamble portion 601, there is a three byte long delimiter portion 602, which denotes the start of a burst header portion 603. The burst header portion 603 contains an ONU-ID field 605, for identification of an ONU that generated the burst 600A. Next to the burst header 603 there is a physical layer operation and maintenance upstream (PLOAMu) message 604. In FIG. 6A, the PLOAMu message 604 is a Serial_Number_ONU physical layer operation and maintenance (PLOAM) message as specified in the ITU-T G984.3 communications protocol. The Serial_Number_ONU PLOAM message 604 contains a one byte long ONU-ID field 606 and an eight bytes long ONU-SN field 607, which holds a vendor-specific serial number of the ONU which has sent the upstream burst 600A, e.g. the ONU 206.1 of FIG. 2.

Figure 6B:
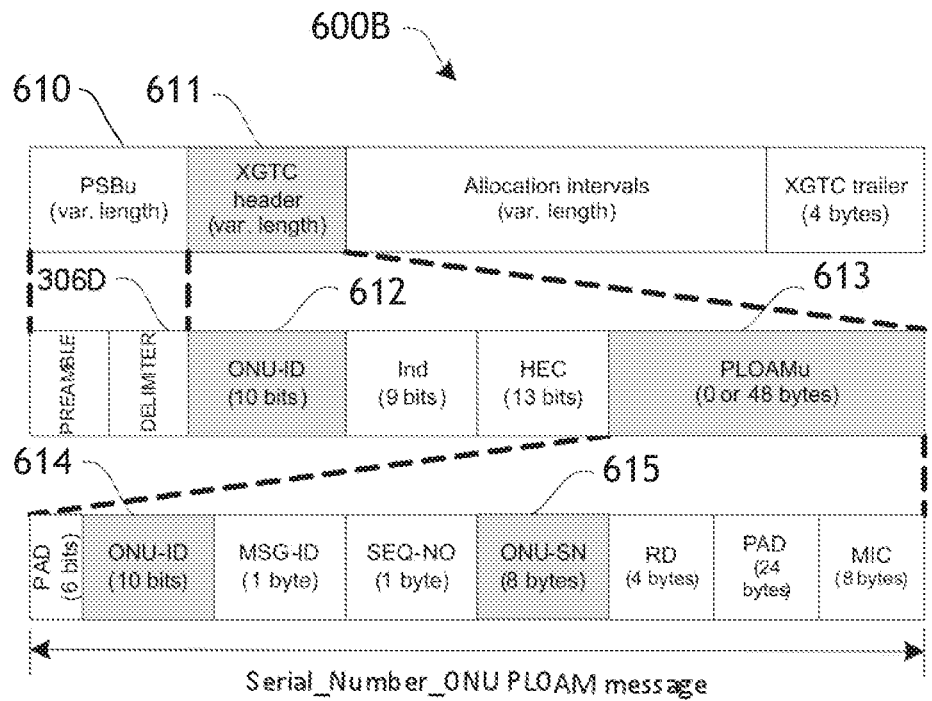
FIG. 6B is a schematic data structure diagram indicating a location of an ONU identification number (ONU-ID) and an ONU serial number (ONU-SN) in a 10 gigabit-capable PON (XG-PON) upstream data burst.

Turning to FIG. 6B, a structure of a typical XG-PON upstream burst 600B is shown. The upstream burst 600B includes an upstream physical synchronization block (PSBu) 610, which may have a dynamically defined length. Next to the PSBu 610 a XG-PON transmission convergence (XGTC) header portion 611 is disposed. The XGTC header portion 611 contains a ten bit long ONU-ID field 612 and optionally a PLOAMu message 613. In FIG. 6B, the PLOAMu message 613 is a Serial_Number_ONU PLOAM message as specified in the standard ITU-T G987.3. The Serial_Number_ONU PLOAM message 613 contains a ten bit long ONU-ID field 614 and an eight byte long ONU-SN field 615 holding a vendor-specific serial number of the ONU which has sent the upstream burst 600B, e.g. the ONU 206.1 of FIG. 2.

Figure 6C:
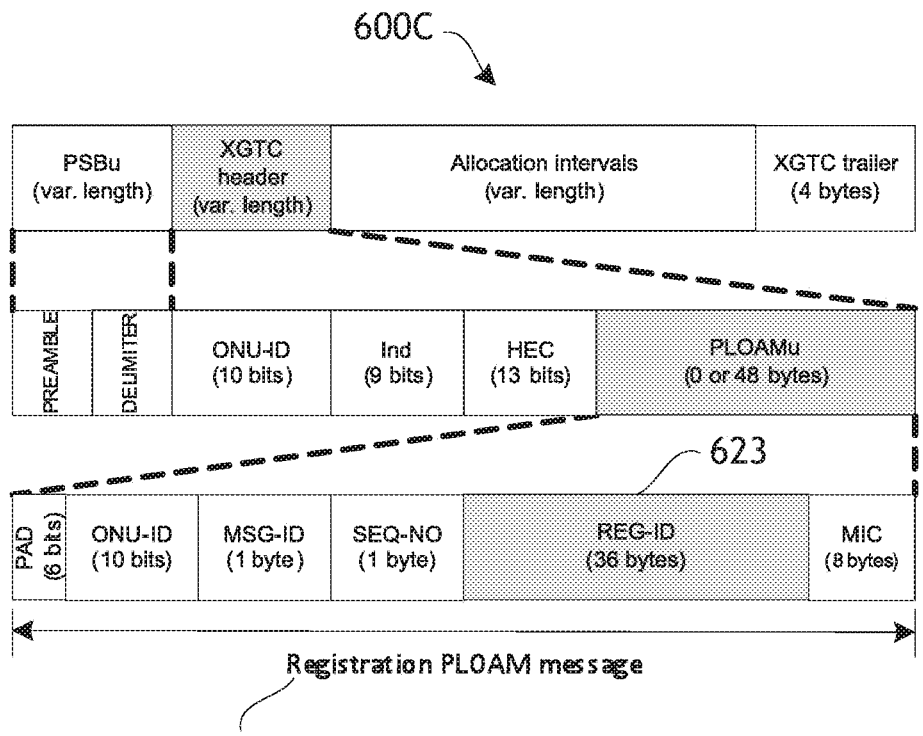
FIG. 6C is a schematic data structure diagram indicating a location of an ONU network registration number (REG-ID) in a 10 gigabit-capable PON (XG-PON) upstream data burst.

Referring to FIG. 6C, a structure of a typical XG-PON upstream burst 600C is similar to the PON upstream burst 600B of FIG. 6B, but instead of the PLOAM message 613 including the Serial_Number_ONU field 615 in FIG. 6B, an upstream burst with a Registration PLOAM message 622 is shown in FIG. 6C, pursuant to the ITU-T G987.3 communications protocol. The Registration PLOAM message 622 contains a thirty six bytes long REG-ID field 623, which holds a registration identifier usable for identifying the ONU which has generated the upstream burst 600C, e.g. the ONU 206.1 in the PON 211 of FIG. 2.

Figure 6D:
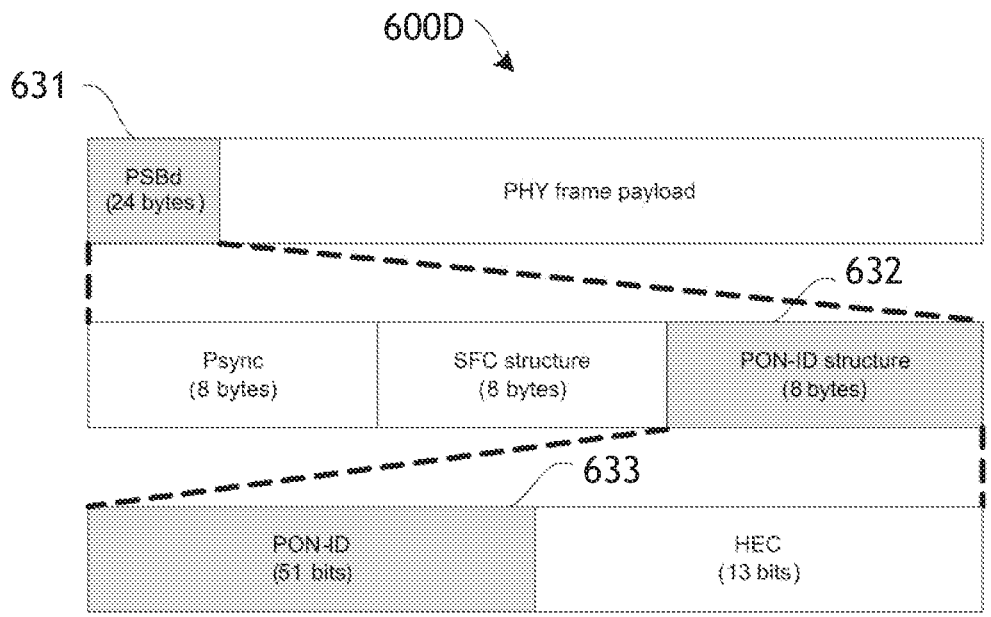
FIG. 6D is a schematic data structure diagram indicating a location of a PON identification number (PON-ID) in a 10 gigabit-capable PON (XG-PON) downstream data frame.

Turning to FIG. 6D, a structure of a typical XG-PON downstream frame 600D according to ITU-T G987.3 communications standard is illustrated. The frame 600D includes a physical control block downstream (PSBd) structure 631. The PSBd structure 631 contains a PON-ID structure 632. The PON-ID structure 632 contains a fifty one bit long PON-ID field 633 holding a PON-ID of the OLT which has sent the downstream frame 600D, e.g. the OLT 202 of FIG. 2.

Figure 6E:
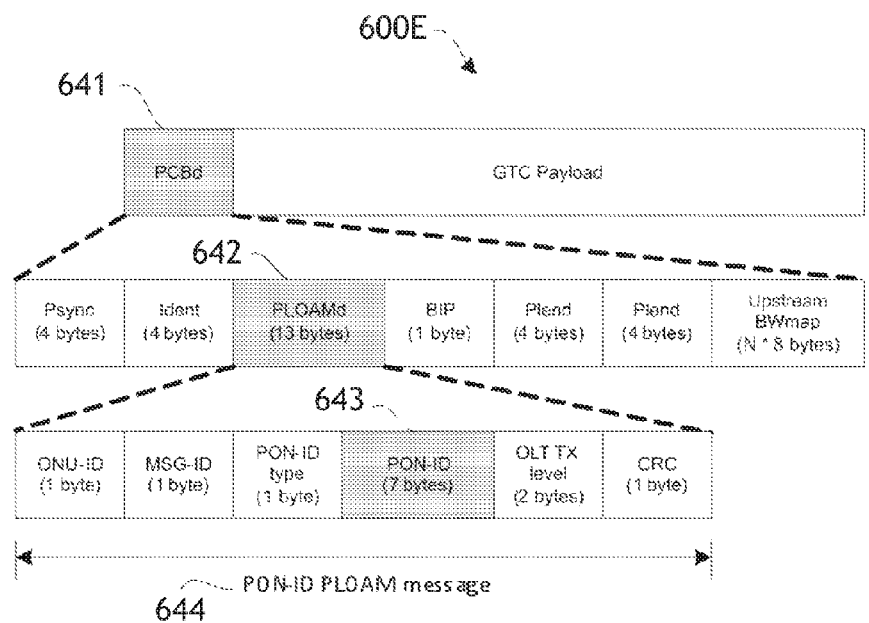
FIG. 6E is a schematic data structure diagram indicating a location of a PON identification number (PON-ID) in a gigabit PON (G-PON) downstream data frame.

Referring to FIG. 6E, a structure of a typical G-PON downstream frame 600E according to ITU-T G984.3 communications standard is presented. The G-PON downstream frame 600E includes a PCBd structure 641. The PCBd structure 641 contains a physical layer operation and management downstream (PLOAMd) message 642. In FIG. 6E, the PLOAMd message 642 includes a PON-ID PLOAM message 644 as specified in the ITU-T G984.3 communications protocol, Amendment 3. The PON-ID PLOAM message 644 contains a seven bytes long PON-ID field 643 holding a PON-ID of the OLT which has sent the downstream frame 600E, e.g. the OLT 202 of FIG. 2.

Figure 6F:
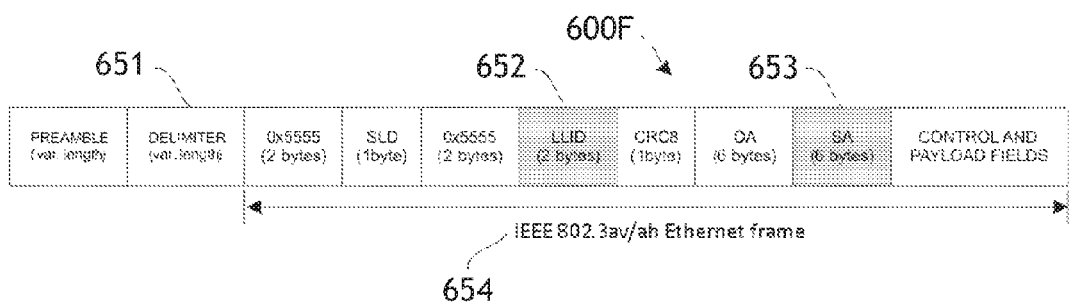
FIG. 6F is a schematic data structure diagram showing a logical link ID (LLID) and a source MAC address (SA) in an upstream burst of a 10 GB/s Ethernet PON (10G-EPON)

Turning to FIG. 6F, a structure of a typical EPON or 10G-EPON upstream burst 600F is shown. The upstream burst 600F comprises a delimiter bit pattern 651, used for determining the start of an Ethernet frame 654. The EPON or 10G-EPON upstream burst 600F further includes a logical link identifier (LLID) field 652 and a fifteen bit long LLID value and a source address (SA) field 653, which contains a media access control (MAC) address of the source transmitting the upstream frame. In EPON or 10G-EPON systems this source address may be used for identifying the ONU which has generated the upstream burst 600F, e.g. the ONU 206.1 in the PON 211 of FIG. 2.

Figure 6G:
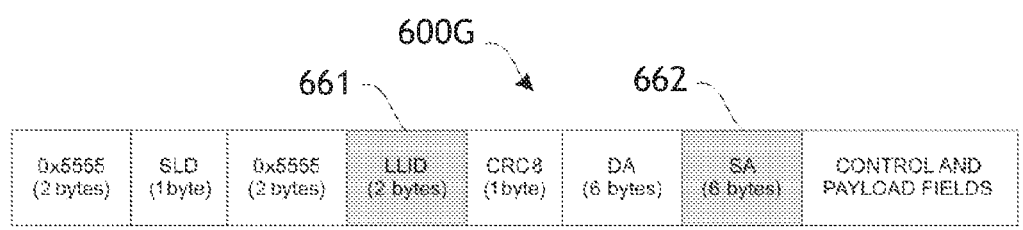
FIG. 6G is a schematic data structure diagram showing a logical link ID (LLID) and a source MAC address in a downstream frame of a 10 GB/s Ethernet PON (10G-EPON)

Referring now to FIG. 6G, a structure of a typical EPON or 10G-EPON downstream frame 600G is shown. The EPON or 10G-EPON downstream frame 600G comprises an LLID field 661 and a SA field 662, which contains a MAC address of the source of the downstream frame 600G. In EPON or 10G-EPON systems, this source address may be used as an identification means for the OLT which has sent the downstream frame 600G, e.g. the OLT 202 of FIG. 2.

Exemplary processes of capturing relevant bit streams and extracting the ONU and OLT identifiers will now be considered in detail with reference to FIGS. 7A to 7F. These exemplary processes represent possible variants of the capturing 503 and extracting 504 steps of the method 500 (FIG. 5).

Figure 7A:
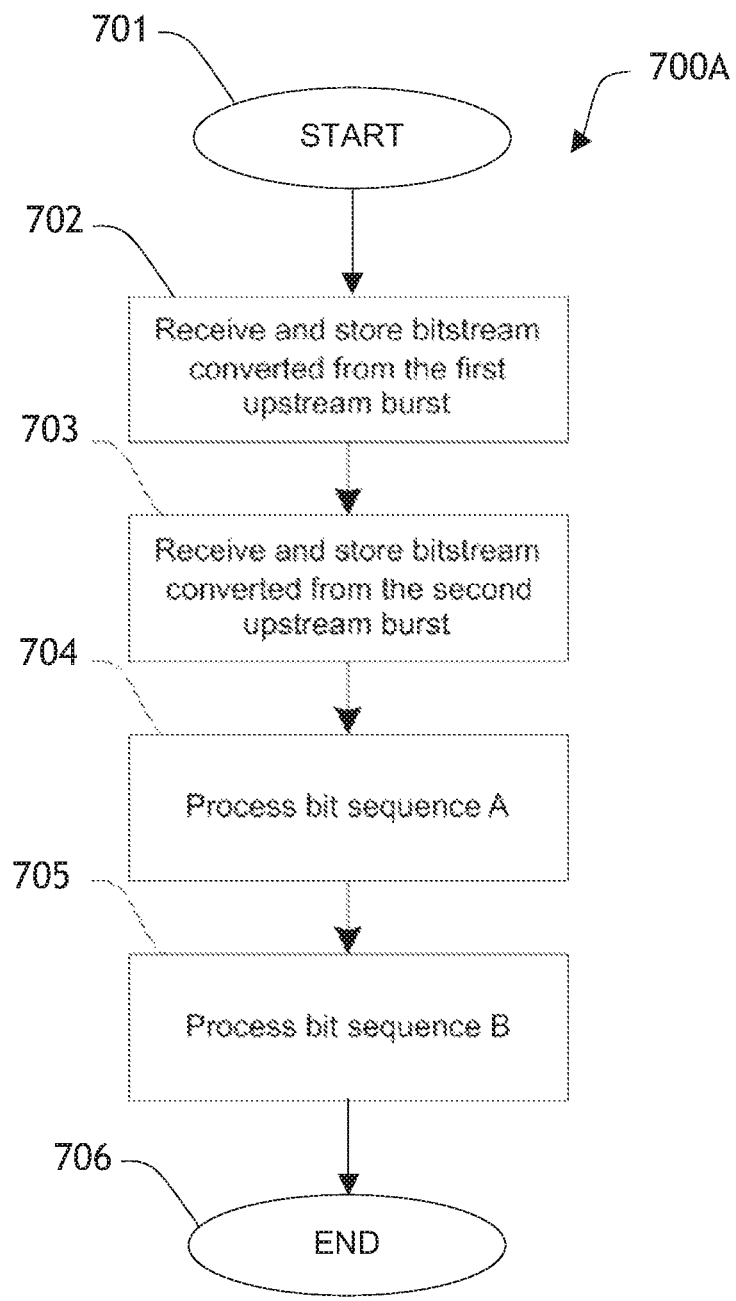
FIG. 7A illustrates an exemplary flow chart of a method for extracting an ONU-ID of FIG. 6A from an upstream burst in a G-PON.

Referring first to FIG. 7A, an exemplary process 700A may be used to obtain the ONU-SN 607 and the ONU-ID 605, 606 (FIG. 6A) from an upstream burst in a GPON system. The process 700A (FIG. 7A) starts at 701. In a step 702, a first upstream burst sent from the first ONU 206.1 (FIG. 3) is received and stored in the non-transitional memory 422 (FIGS. 4A to 4D) as "bit sequence A". The bit sequence A may contain Serial_Number_ONU PLOAMu message 604 (FIG. 6A). In a step 703, a second upstream burst sent from the first ONU 206.1 (FIG. 3) is received and stored in the non-transitional memory 422 (FIG. 4A) as "bit sequence B". Bit sequence B may include the ONU-SN 607. In both bit sequences A and B, the delimiter bit pattern 602 may be used to determine the start of the burst header section 603 (FIG. 6A). In a step 704, the ONU-ID 605, 606 and the ONU-SN 607 may be extracted from the bit sequence A and stored for further data processing. The ONU-ID 605, 606 of the bit sequence A may contain an "unassigned" ONU-ID, which is a default value for ONUs in the serial number state. In a step 705, the ONU-ID 605, 606 field and the ONU-SN 607 may be extracted from the bit sequence B and stored for further data processing. Since the ONU-ID 605, 606 and the ONU-SN 607 may be obtained only from bit sequence B without processing the bit sequence A, the step 704 of processing the bit sequence A is optional. The process 700A ends at 706.

Figure 7B:
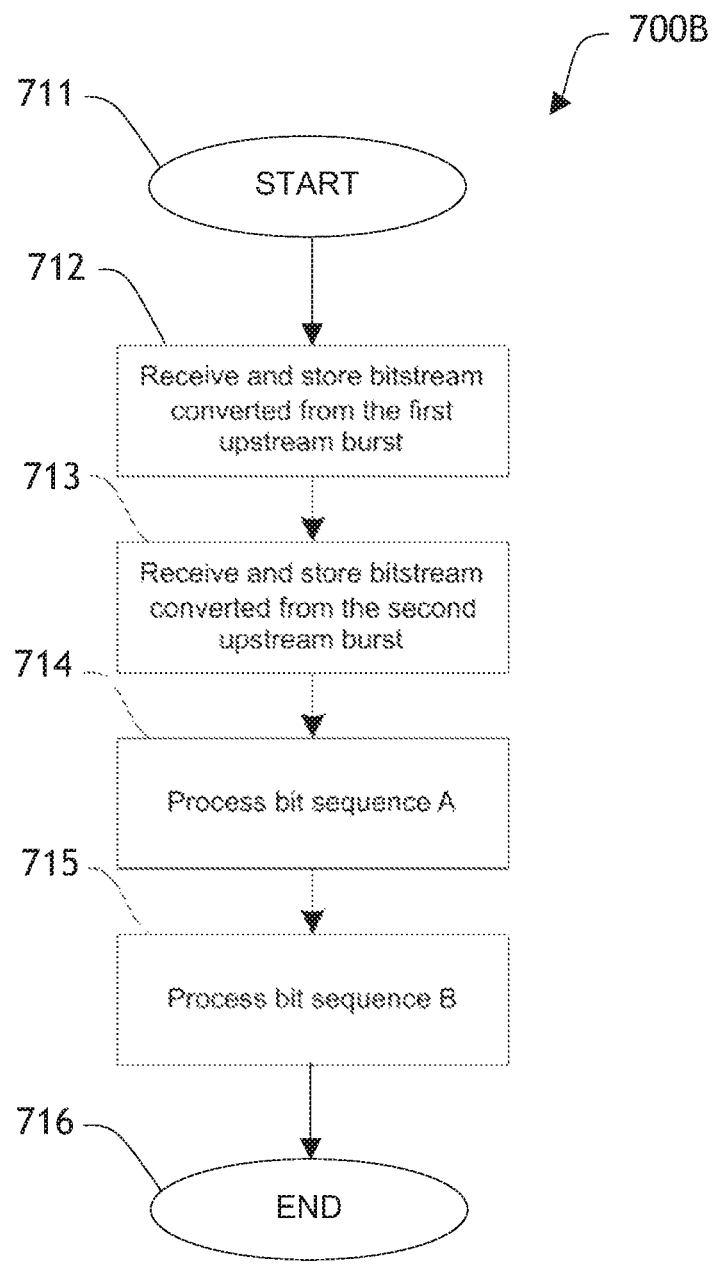
FIG. 7B illustrates an exemplary flow chart of a method for extracting an ONU-ID of FIG. 6B and a REG-ID of FIG. 6C from an upstream burst in an XG-PON.

Turning to FIG. 7B, a process 700B may be used to obtain the ONU-SN 615, ONU-ID 612, 614 (FIG. 6B), and the REG-ID 623 (FIG. 6C) of an ONU from an upstream burst in an XG-PON system. The process 700B of FIG. 7B includes steps 711, 712, 713, 714, 715, and 716 similar to the respective steps 701, 702, 703, 704, 705, and 706 of the process 700A of FIG. 7A. One difference of the process 700B of FIG. 7B is that, if the bit sequence B comprises a Registration PLOAM message, the REG-ID 623 (FIG. 6C) may be extracted and stored for further data processing in the step 714.

Figure 7C:
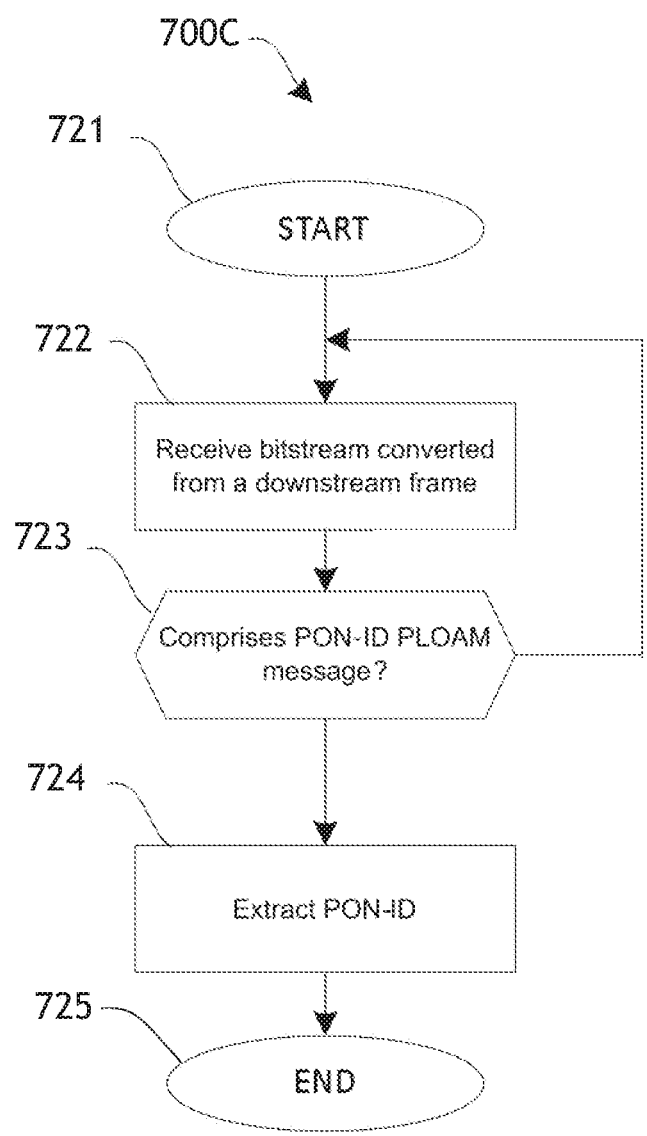
FIG. 7C illustrates an exemplary flow chart of a method for extracting a PON-ID of FIG. 6E from a downstream frame in a G-PON.

Referring to FIG. 7C, a process 700C may be used to obtain the PON-ID 633 (FIG. 6E) from a downstream data frame in a GPON system. The process 700C (FIG. 7C) starts at 721. In a step 722, a bit sequence is extracted from a downstream frame, which may be sent e.g. by the OLT 202 (FIG. 3). The bit sequence may have the structure shown in FIG. 6E. In a step 723, a check is performed whether the bit sequence includes the PON-ID PLOAM message 632, as specified in ITU-T G984.3 Amendment 3. If yes, the PON-ID 633 (FIG. 6E), that is, a network ID number, is extracted and stored for further processing in a step 724. If the bit sequence does not comprise the PON-ID PLOAM message 632, the bit sequence received is discarded and another downstream bit sequence is received. The process 700C ends at 725.

Figure 7D:
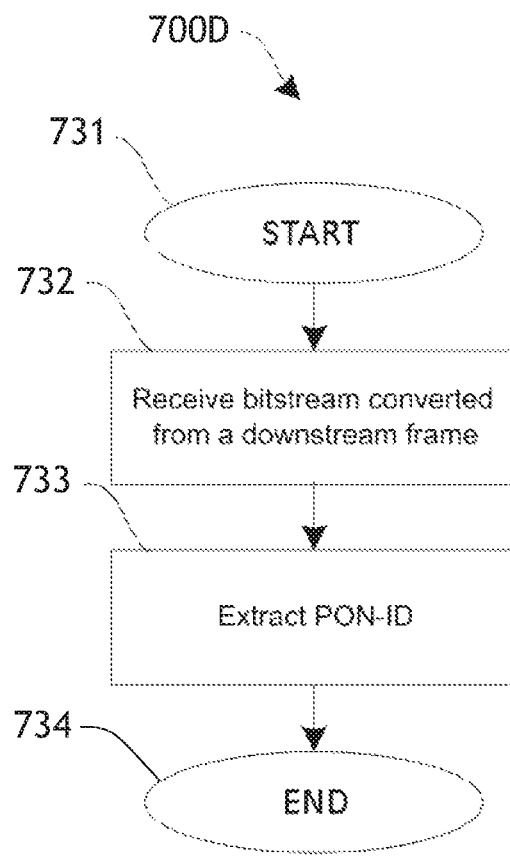
FIG. 7D illustrates an exemplary flow chart of a method for extracting a PON-ID of FIG. 6D from a downstream frame in an XG-PON.

Turning to FIG. 7D, a process 700D may be used to obtain the PON-ID 643 (FIG. 6D) from a downstream data frame in a XG-PON system. The process 700D (FIG. 7D) starts at 731. In a step 732, a received bit sequence is converted from a downstream frame, which may have been sent e.g. by the OLT 202 (FIG. 3). The bit sequence may have the structure shown in FIG. 6D. In a step 733, the PON-ID 643 (FIG. 6D) is extracted from the bit sequence. The process 700D ends at 734.

Figure 7E:
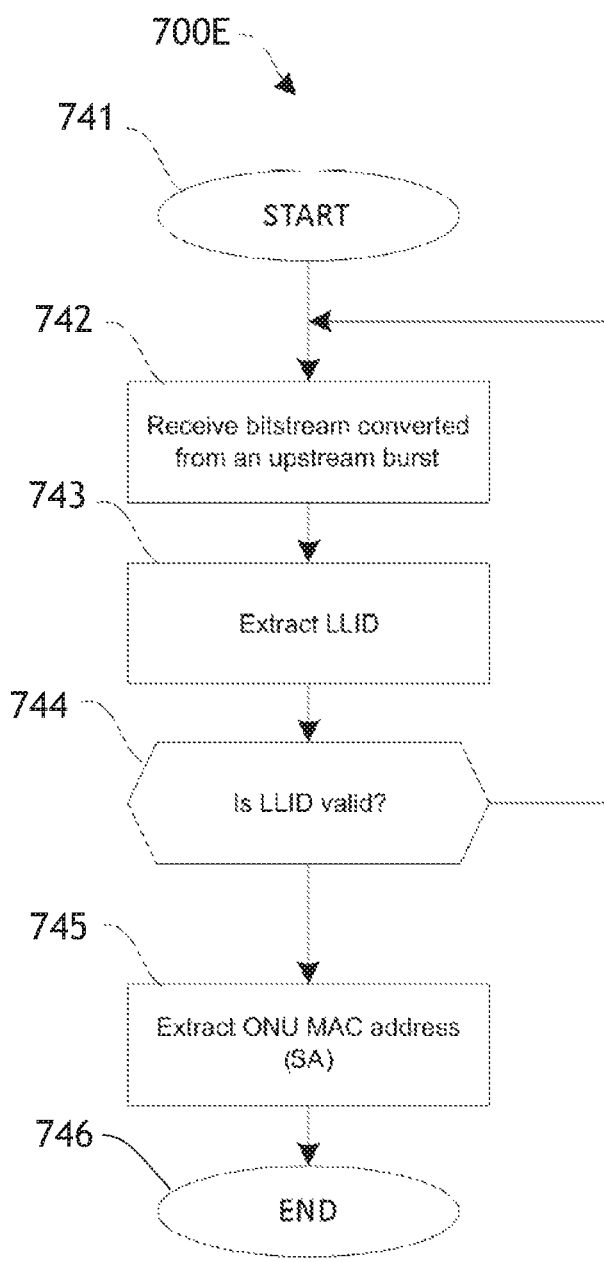
FIG. 7E illustrates an exemplary flow chart of a method for extracting an LLID and a MAC address of FIG. 6F from an upstream burst of an EPON and 10G-EPON.

Referring to FIG. 7E, a process 700E may be used to obtain the LLID 652 and the MAC source address (SA) 653 (FIG. 6F) from an upstream burst in a EPON or 10G-EPON system. The process 700E (FIG. 7E) starts at 741. In a step 742, a bit sequence is extracted from an upstream burst, which may be generated by the first ONU 206.1 (FIG. 3). The received bit sequence may be stored in the non-transitional memory 422 (FIGS. 4A to 4D). The received bit sequence may have the structure shown in FIG. 6F. The delimiter pattern 651 may be used to determine the start of the Ethernet frame 654 (FIG. 6F). In a step 743 (FIG. 7E), the LLID field 652 is extracted from the bit sequence. In a step 744, a check is performed whether the extracted LLID is within a range of valid LLIDs for registered ONUs. If yes, then in a step 745, the source MAC address 653, which is the MAC address of the ONU sending the upstream signal e.g. the first ONU 206.1 (FIG. 2), is extracted and stored for further data processing. If the extracted LLID 652 is not within a range of valid LLIDs for registered ONUs, the bit sequence received in the receiving step 742 is discarded and another bit sequence is captured. The process 700E ends at 746.

Figure 7F:
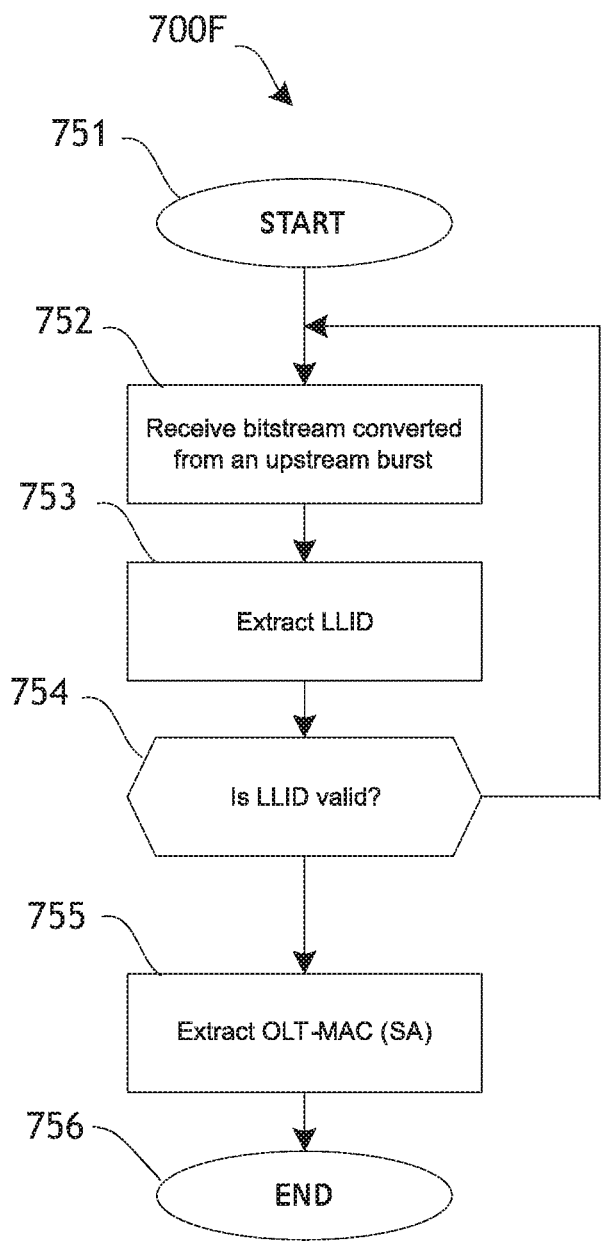
FIG. 7F illustrates an exemplary flow chart of a method for extracting a MAC address of FIG. 6G from a downstream frame of an EPON and 10G-EPON.

Turning to FIG. 7F, a process 700F may be used to obtain the LLID 661 and the MAC SA 662 (FIG. 6G) from a downstream frame in a EPON or 10G-EPON system. The process 700F (FIG. 7F) starts at 751. In a step 752, a bit sequence is extracted from a downstream frame e.g. a downstream frame sent by the OLT 202 (FIG. 3). In a step 753 (FIG. 7F), the LLID field 661 is extracted from the captured bit sequence. In a step 754, a check is performed whether the extracted LLID 661 is within a range of valid LLIDs. If yes, then in a step 755, the MAC SA 662 (FIG. 6G), which is the MAC address of the OLT sending the downstream frame, is extracted and stored for further data processing. If the extracted LLID 661 is not within a range of valid LLIDs, the bit sequence is discarded and another bit sequence is captured. The process 700F ends at 756.

Once the identification information is collected as explained above, and optical power levels measured by the test apparatus 300 of FIG. 3 or 400A to 400D of FIGS. 4A to 4D, the identification information of ONUs and/or OLT may be displayed together with corresponding optical power levels. Referring to FIG. 8, an example summary screen 800 may be shown e.g. on the display 321 of the test apparatus 300 of FIG. 3. The summary screen 800 (FIG. 8) may include wavelengths 802, 806 and optical power levels 803, 807 of either the upstream optical signal or the downstream optical signal or both. Information for identifying the OLT and/or ONU may be displayed. In GPON and XG-PON systems, the ONU(s) are typically identified via their vendor specific serial number (ONU-SN) 804, or their ONU-ID 805. The ONU-ID 805 is a unique number within a given PON. In GPON and XG-PON systems OLTs are typically identified via their PON-ID 808. In EPON and 10G-EPON systems ONUs and OLTs are typically identified via their MAC address (not shown in FIG. 8). Furthermore, ONUs may be identified via their LLID (not shown in FIG. 8), which is a unique number within a given PON. The PON type is shown at 801, which typically is a device setting selected prior to starting the test.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A network measuring and testing apparatus, the apparatus comprising:
   an optical circuit including at least one port to couple the apparatus to a test point between an optical line terminal (OLT) and an optical network unit (ONU) in an optical network;
   a controller coupled to the optical circuit to:
      initiate an activation procedure in the ONU for establishing communication with the OLT; and
      determine an identifier of at least one of the ONU and the OLT from a signal generated according to the activation procedure; and
   a display coupled to the controller to display the identifier of the at least one of the ONU and the OLT.

2. The apparatus of claim 1, wherein the controller is to:
   receive at least a portion of upstream traffic from the ONU during the activation procedure, wherein the portion of upstream traffic includes the signal generated according to the activation procedure; and
   to determine the identifier of the at least one of the ONU and the OLT, the controller is to determine the identifier of the ONU by extracting identification information of the ONU from the at least a portion of upstream traffic.

3. The apparatus of claim 1, further comprising a display interface wherein the controller is to:
   measure an optical power level of the signal generated according to the activation procedure; and
   display the optical power level.

4. The apparatus of claim 1, wherein the controller is to:
   interrupt communication between the OLT and ONU to initiate the activation procedure in the ONU.

5. The apparatus of claim 4, wherein the optical circuit comprises an optical breaker switch, and wherein to interrupt communication between the OLT and ONU, the controller is to cause the optical breaker switch to temporarily interrupt the communication between the OLT and ONU to invoke the activation procedure in the ONU.

6. The apparatus of claim 5, wherein to temporarily interrupt the communication between the OLT and ONU, the controller is to cause the optical breaker switch to disconnect at least one of an upstream connection and a downstream connection between the OLT and the ONU for less than or equal to one second.

7. The apparatus of claim 1, wherein to determine the identifier of the ONU, the controller is to:
   identify a header in an upstream message from the ONU; and
   parse the header to extract the identifier of the ONU.

8. The apparatus of claim 1, wherein the at least one port is to receive downstream traffic from the OLT, and the controller is to extract identification information of at least one of the OLT and the optical network from the downstream traffic.

9. The apparatus of claim 1, comprising:
   an optical receiver to receive upstream traffic from the ONU; and
   an optical power meter to measure an optical power level of the upstream traffic.

10. The apparatus of claim 9, comprising:
    a downstream optical receiver to receive downstream traffic from the OLT; and
    a downstream optical power meter to measure an optical power level of the downstream traffic,
    wherein the display is to display the optical power level of at least one of the upstream traffic and the downstream traffic.

11. An optical network apparatus, the apparatus comprising:
    an optical circuit including at least one port to couple the apparatus at a point in an optical network between an optical line terminal (OLT) and an optical network unit (ONU) in the optical network; and
    a controller coupled to the optical circuit to:
       initiate an activation procedure in the ONU for establishing communication with the OLT; and
       extract identification information of the ONU from upstream traffic from the ONU during the activation procedure.

12. The apparatus of claim 11, wherein to initiate the activation procedure in the ONU, the controller is to cause the optical circuit to temporarily interrupt communication between the OLT and ONU.

13. The apparatus of claim 11, wherein to extract identification information of the ONU, the controller is to:
    identify a header in an upstream message from the ONU; and
    parse the header to extract the identification information of the ONU.

14. The apparatus of claim 11, wherein the at least one port is to receive downstream traffic from the OLT, and the controller is to extract identification information of at least one of the OLT and the optical network from the downstream traffic.

15. The apparatus of claim 11, wherein the optical circuit comprises an optical breaker switch, and
    wherein to initiate the activation procedure in the ONU, the controller is to temporarily interrupt communication between the OLT and ONU, by causing the optical breaker switch to temporarily interrupt the communication between the OLT and ONU to invoke the activation procedure in the ONU.

16. The apparatus of claim 11, comprising:
at least one optical receiver to receive at least one of upstream traffic from the ONU and downstream traffic from the OLT; and
at least one optical power meter to measure at least one of an optical power level of the upstream traffic and an optical power level of the downstream traffic.

17. The apparatus of claim 16, further comprising a display to display at least one of the optical power level of the upstream traffic and the optical power level of the downstream traffic and to display the identification information of the ONU.

18. A method of testing an optical network comprising:
controlling an optical circuit in an apparatus to initiate an activation procedure for establishing communication between an optical line terminal (OLT) and an optical network unit (ONU) in the optical network;
receiving, in the apparatus, upstream traffic from the ONU during the activation procedure of the ONU;
determining an identifier of at least one of the ONU and the OLT from a signal generated according to the activation procedure; and
displaying the identifier of the at least one of the ONU and the OLT.

19. The method of claim 18,
wherein controlling the optical circuit to initiate the activation procedure comprises interrupting the communication between the OLT and ONU,
wherein determining the identifier of the at least one the ONU and the OLT comprises extracting identification information of the ONU, and
wherein extracting the identification information of the ONU comprises:
identifying a header in an upstream message from the ONU; and
parsing the header to extract the identification information of the ONU.

20. The method of claim 18, comprising:
receiving downstream traffic from the OLT;
extracting identification information of at least one of the OLT and the optical network from the downstream traffic;
measuring an optical power level of at least one of the upstream traffic and the downstream traffic; and
displaying the optical power level of at least one of the upstream traffic and the downstream traffic on a display of the apparatus.

* * * * *